United States Patent
O'Regan

[15] 3,698,788
[45] Oct. 17, 1972

[54] MULTIPASS INTERFEROMETER

[72] Inventor: Richard O'Regan, Summit, N.J.

[73] Assignee: Bell Telephone Laboratories, Incorporated, Murray Hill, N.J.

[22] Filed: June 29, 1971

[21] Appl. No.: 157,927

[52] U.S. Cl.....................350/3.5, 356/107
[51] Int. Cl..................G01b 9/02, G02b 27/22
[58] Field of Search.......356/106, 107, 112; 350/3.5, 350/160

[56] References Cited

UNITED STATES PATENTS 3,492,063   1/1970   Lee...........................350/160
3,528,719   9/1970   Brooks.......................350/3.5

OTHER PUBLICATIONS

Weigl et al., QE- 6 IEEE J. of Quantum Elec. pp. 41- 43 (1/1970).
Langenbeck, 8 Applied Optics, 543- 552, (3/1969).
Heflinger et al., 37 J. App. Phys. 642- 649, (2/1966).

*Primary Examiner*—David Schonberg
*Assistant Examiner*—Robert L. Sherman
*Attorney*—R. J. Guenther et al.

[57] ABSTRACT

An interferometer is provided with a multipass optical cavity. In the multipass optical cavity, an object beam passes several times through the object space. The sensitivity of the interferometer is increased by a factor directly proportional to the number of passes through the object space.

The multipass cavity comprises two cavity mirrors and an arrangement of lenses. The lenses image each cavity mirror onto the other. A light ray incident on a particular point on one of the cavity mirrors returns to the same point on each subsequent pass through the cavity. The object beam is extracted from the cavity after it has made the desired number of passes. It is then combined with a reference beam to form an interference pattern or a hologram.

12 Claims, 3 Drawing Figures

INVENTOR
R. O'REGAN
BY William Ryan
ATTORNEY

MULTIPASS INTERFEROMETER

This invention relates to optical interferometry and, more particularly, to multipass interferometry. The invention further relates to holography and to the holographic recording of multipass interferograms.

BACKGROUND OF THE INVENTION

Interferometry is a widely useful technique in testing of optical surfaces and in the measurement of the phase-refractive index of transparent media. In the art of interferometry, an interference pattern is formed when a reference light beam from a coherent source is made to interfere with a light beam from the same source which has been made to pass through or be reflected from the object being studied. This latter beam is known as the object beam. The reference beam and the object beam are combined in an interference plane to produce the interference pattern. This pattern may consist of a series of fringes, the gross spacing of which depends upon the angle between the reference beam and the object beam at the interference plane. Variations on this gross spacing are produced by variations in the optical path length introduced by the object. By interpreting the fringe pattern the characteristics of the object which affect the optical path length through the object space may be measured. An example of such a measurable characteristic is the variation in the index of refraction of a gas or other transparent medium. Another such example is deformation in the surface of one of the mirrors, which may itself be the object.

Often, interferometry is severely limited as a measuring technique because of its limited sensitivity. By this it is meant that the wavefront variations in the object beam may be so small the fringes are insufficiently detailed for accurate measurement. This situation might arise, for example, in attempting to measure very small departures from flatness of a mirror surface or in measuring small variations in the index of refraction of gases.

It is desirable, therefore, to provide a technique for increasing the sensitivity of interferometers. This can be done by causing the object beam to pass through the object space a number of times. Thus the phase variations in the beam wavefront introduced by the object have a cumulative effect to increase the fringe shift at the interferogram plane.

It is therefore a broad objective of the present invention to provide a multipass interferometer wherein very high sensitivity is achieved by means of multiple reflections of an object beam through an object space.

Several techniques for achieving multiple passage of the object beam through the object space in an interferometer are known in the prior art. For example, F. Weigl et al, in "Multiple-Pass Nondiffuse Holographic Interferometry," IEEE Journal of Quantum Electronics, Vol. QE–6, No. 1, January, 1970, pp. 41–43, disclose an interferometer wherein the object space is located between two parallel partially silvered mirrors. These mirrors divide the object beam into a set of component object beams, each of which traverses the object space a different number of times. However, no provision is made for spatially separating the different component object beams in a direction perpendicular to the direction of propagation. Therefore, selection of the desired component object beam to interfere with the reference beam is made dependent upon the use of a source of limited coherence, e.g., a pulsed laser.

Accordingly, it is an object of the present invention to provide advantageously a multipass interferometer wherein the component object beams corresponding to different numbers of passes are separated spatially so that one particular component object beam may be selected and directed to interfere with the reference beam.

Another technique for achieving multipass interferometry is shown, for example, in U.S. Pat. No. 3,528,719, issued to R. E. Brooks on Sept. 15, 1970. A similar scheme is shown in P. H. Langenbeck, "Multipass Interferometry," Applied Optics, Vol. 8, No. 3, pp. 543–552. In these techniques, the object beam is reflected between two nominally planar, but not parallel mirrors. One of the mirrors is partially reflecting. Different portions of the object beam emerge from the object space through the partially reflecting mirror. Each portion emerges at a different angle, corresponding to the number of passes that portion has made through the object space. A lens is used to separate the several portions of the object beam into corresponding wavefronts, each of which converges to a particular point in the focal plane of the lens. One of these points is selected by an aperture in the focal plane of the lens, and the light passing through this aperture is allowed to interfere with the reference beam. Thus this technique does provide for spatial separation of the component object beams. A disadvantage of this technique, however, is that a light ray impinging on one spot of one of the mirrors will not return to exactly the same spot on the next pass, due to the fact that the two mirrors are not parallel. This is known as the "walk-off" problem and leads to decreased resolution and misinterpretation of fringe patterns for larger numbers of passes.

It is therefore a further object of this invention to provide a multipass interferometer wherein a light ray which is reflected from a particular point on one of the mirrors for one pass will return to the same point on all subsequent passes.

In all of the prior art techniques cited above, use is made of at least one partially transparent mirror to form the multipass optical cavity within which the object beam is reflected. Consequently, the intensities of the component object beams decrease for successive passes. This decrease in intensity places an upper limit on the number of passes.

It is then a still further object of this invention to provide an optical cavity wherein a light beam may be successively reflected between two mirrors, neither of which is partially transparent, so that the entire light beam may be extracted from the cavity after it has made a given number of passes.

In order to achieve fringes in the interference plane which are wide enough to be visible, it is necessary to bring the reference beam and the object beam together at the interference plane at a very small angle with respect to each other. This requirement is obviated in the technique of double exposure holographic interferometry, described generally in "Holographic Interferometry," by L. O. Heflinger et al, Journal of Applied Physics, Vol. 37, number 2, pages 642–549. In this technique a photographic plate in the interference plane is exposed twice to form a superposition of two holograms. When the developed hologram is viewed, an image of the object is formed upon which are superposed fringes corresponding to the difference in the optical path length through the multipass cavity from one exposure to the next. This technique, then, is particularly well suited for forming interferograms of dynamic objects.

It is therefore an additional object of this invention to provide a multipass optical cavity which can be used in the technique of double exposure holographic interferometry to achieve increased sensitivity.

There is another method of holographic interferometry which is especially useful. In this technique only one exposure of a photographic plate is made. The plate is developed to form a hologram and then reinserted at its original position in the holographic apparatus. When the developed hologram is again illuminated with the reference beam and the object beam, interference takes place between the reconstructed wavefront and the wavefront presently coming from the object. Thus differences between the object as it existed when the original plate was exposed and the object as it evolves can be observed in real time. This technique is therefore known as real time holographic interferometry. As in the case of double exposure holographic interferometry, there is no requirement that the object beam and the reference beam come together at a very small angle with respect to each other.

It is therefore still another object of this invention to provide a high sensitivity real time holographic interferometer with a multipass optical cavity.

SUMMARY OF THE INVENTION

The objects presented above, together with others which will be apparent to those skilled in the art, are achieved in the present invention through a unique arrangement of two mirrors together with lenses which image each of the two mirrors onto the other.

In a preferred embodiment, two identical lenses are spaced apart a distance equal to twice their common focal length. The two lenses thus have a common optical axis and a common focal plane which is perpendicular to the optical axis and intersects the axis at a point halfway between the two lenses. A plane mirror is placed on each side of the pair of lenses. These mirrors are designated cavity mirrors. The first of these two cavity mirrors is perpendicular to the optical axis of the lenses and the other is slightly inclined with respect to the first. For example, a typical angle of inclination is 0.2°. The two cavity mirrors are each spaced away from the nearest lens a distance equal to the common focal length. Therefore, each of the two cavity mirrors is imaged onto the other.

The object beam may be introduced into this interferometer in a number of ways. For example, suitable optics may be used to focus a beam from a laser source to a point. The beam is made to reflect from a small mirror inserted at this point, which is between the two lenses. This beam then passes through the first lens to a corresponding cavity mirror from which it is reflected back through the first lens. The beam comes to a focus at a different point in the space between the two lenses and then passes through the second lens to the second cavity mirror. The object beam is then reflected from this mirror and returns through the second lens again to be focused at still a different point in the space between the two lenses. This process may be repeated a number of times. Once on each pass through the interferometer cavity the object beam comes to a focus at a point in the space between the two lenses.

The desired number of passes having been achieved, the object beam may be intercepted and directed out of the cavity to the interference plane. This may be accomplished, for example, by providing another small mirror in the cavity to intercept the object beam at the point between the two lenses where the beam comes to a focus after the desired pass. This latter mirror will reflect the object beam to a suitable plane outside the cavity.

A beam splitter may be used to derive a reference beam from the same laser which furnishes the object beam. Suitable optics are used to direct this beam onto the aforementioned interference plane.

The object to be studied may comprise one of the cavity mirror surfaces itself. Alternately, a transparent object may be placed in the space between either cavity mirror and its adjacent lens. For the best performance, the object should be placed as close as possible to one of the cavity mirrors. For example, in one embodiment, the object is placed within a distance of 1–2 centimeters from one cavity mirror, the total separation of the cavity mirrors being 20 centimeters. The object space is defined to include one cavity mirror surface and the volume inside the cavity which is immediately adjacent to this surface.

Accordingly, an interference pattern is formed at the interference plane. At that plane, the reference beam interferes with the object beam. The object beam of course has passed through the object space a number of times. This number is determined by the positioning of the small mirror between the lenses which intercepts the beam.

The sensitivity of the interferometer will therefore be advantageously multiplied by a factor equal to the number of times the object has passed through the object space.

The manner in which the present invention operates to achieve this increased sinsitivity will be made clear by reference to the accompanying drawing and to the following detailed description of an embodiment of the invention.

DETAILED DESCRIPTION

Figure 1:
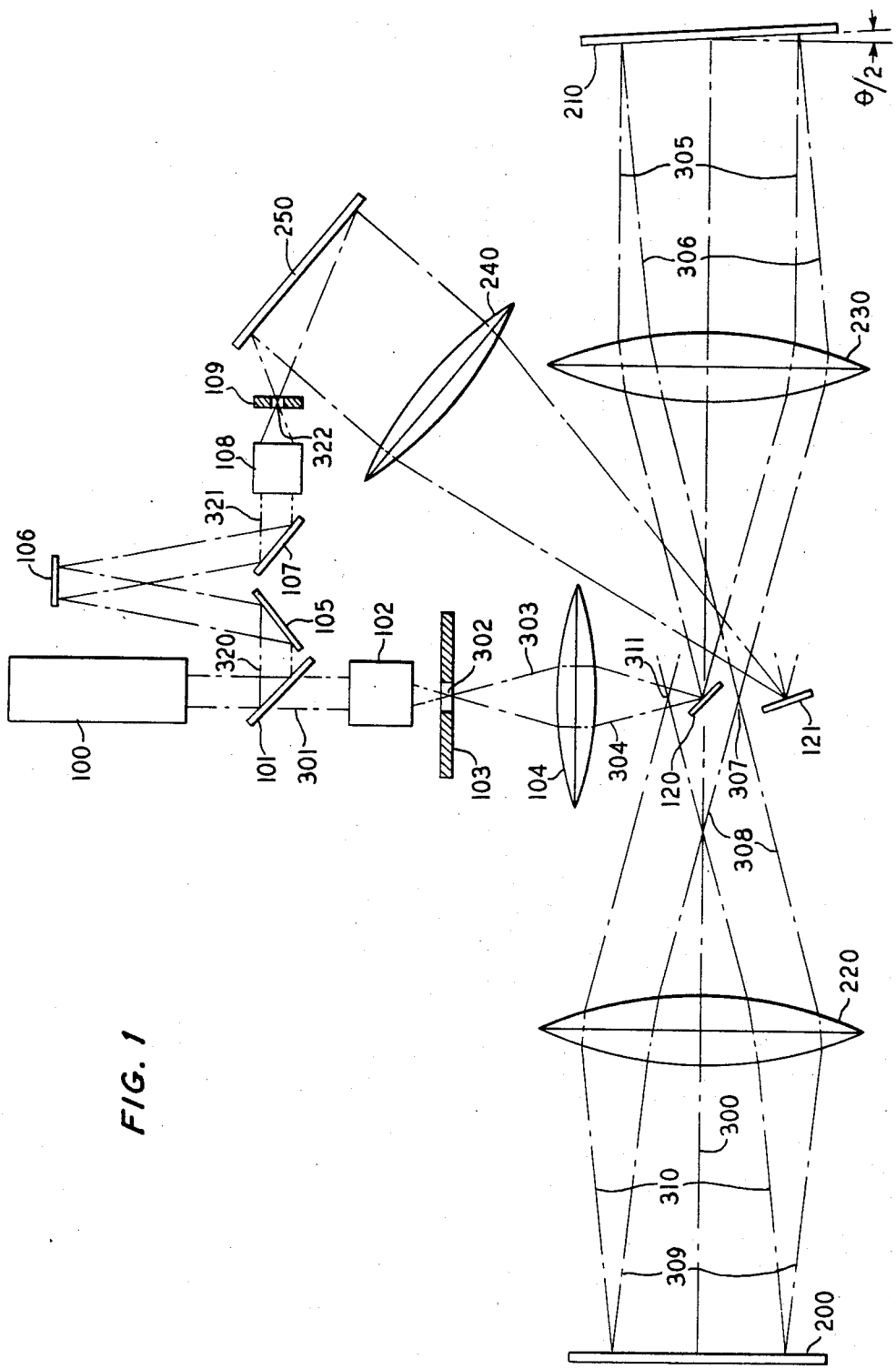
FIG. 1 shows a multipass interferometer constructed according to the teachings of the present invention.

In the embodiment of the invention illustrated in FIG. 1 a laser 100 is used as a source of coherent light for the interferometer. This laser may be either of the continuous wave or of the pulsed variety, depending upon the particular application of the interferometer. The output beam from the laser passes through beam splitter 101 which separates the beam into an object beam and a reference beam.

In the immediately following paragraphs, the path of the object beam through the multipass optical cavity will be described. Since the object beam makes several passes through the multipass optical cavity, it will be convenient to refer to different parts of the object beam by different numerical designations. For example the part of the object beam leaving beam splitter 101 is referred to as object beam 301. The designation "object beam," without a suffix, will be used generically when no distinction is necessary.

The object beam 301 must be introduced into the multipass optical cavity. This cavity is defined as a right circular cylinder having a length equal to the distance between cavity mirrors 200 and 210 and a radius equal to the radius of the cavity mirrors. In the embodiment shown in FIG. 1, the introduction of the object beam into the cavity is accomplished by allowing the object beam 301 emerging from the beam splitter 101 to be focused to a point 302 by short focal length lens 102. This short focal length lens may be of the variety typically used as a microscope objective, for example. A pinhole spatial filter 103 is placed at this focus point 302. The beam 303 emerges from the pinhole filter and is refocused by lens 104 to form beam 304. The beam 304 converges to a point which is located at the surface of small mirror 120. This mirror is made only large enough to intercept the object beam and is typically much smaller than either of the cavity mirrors. A typical diameter for small mirror 120 would lie in the range of 0.008 to 0.1 centimeters. This small mirror is located centrally in the multipass optical cavity at the common focal point of lenses 220 and 230. The small mirror 120 is positioned at an angle so that the object beam is reflected along the axis 300 of the multipass optical cavity.

Since the object beam was focused to a point at the focal point of lens 230, this beam will appear as a plane wave as it emerges to the right of lens 230. This plane wave beam 305 is then reflected from cavity mirror 210. This mirror is inclined with respect to a plane perpendicular to the axis of the optical cavity at an angle $\theta/2$. Thus the object beam 305 after reflection from this mirror becomes a plane wavefront beam 306 propagating at an angle $\theta/2$ with respect to the optical axis 300 of the multipass cavity. This reflected beam 306 is again incident on lens 230. There it is refocused so that it converges to a point 307 in the focal plane of this lens. According to the theory of geometrical optics, this new focus point 307 will be at a distance $\theta f$ below the original point where small mirror 120 intercepts the object beam.

The beam 308 will then continue propagating toward lens 220 which will then focus this beam into essentially plane wavefronts, indicated by beam 309. Mirror 200 intercepts the beam 309 and reflects it back toward lens 220. Mirror 200 is arranged to be perpendicular to the optical axis 300 of the system. The plane wavefronts propagating from mirror 200 to lens 220, indicated by beam 310, are refocused by lens 220 into converging wavefronts which are focused to a point 311 in the common focal plane a distance $\theta f$ above the optical axis of the interferometer cavity. It should be noted that small mirror 120 has dimensions sufficiently small so that this mirror does not interfere with the passage of the object beam through the cavity after the mirror has initially intercepted object beam 304 and directed it into the cavity. That is to say, its extensions above and below the optical axis 300 are less than $\theta f$.

This process is continued for as many passes through the multipass cavity as are desired. On the next pass from right to left through the cavity the beam will be focused at a distance $2\theta f$ below the optical axis in the common focal plane. On the next pass from left to right the object beam will be focused to a point at a distance $2\theta f$ above the optical axis in the common focal plane.

A small mirror 121 is located in the common focal plane so as to intercept the object beam at the point at which this beam comes to a focus after having made the desired number of passes. Small mirror 121 is similar in size and other characteristics to small mirror 120. This mirror 121 directs the object beam to lens 240, which is external to the multipass cavity. Lens 240 directs the object beam onto a plane in which photographic plate 250 is placed. At this interference plane the object beam interferes with the reference beam to form the interference pattern.

As was pointed out above, the reference beam is derived from the same source as is the object beam by means of beam splitter 101. The reference beam portion 320 of the beam from the source is reflected by a series of mirrors 105, 106, and 107 to provide an optical path length for the reference beam corresponding to the optical path length for the object beam. This is necessary due to the finite coherence length of the beam from laser 100. The coherence length determines the maximum difference in path length between reference and object beams which will allow interference. After being diverted by this series of mirrors, the reference beam 321 is focused to a point 322 by short focal length lens 108. A pinhole spatial filter 109 is placed at this focal point 322. The beam then diverges from this focal point 322 to impinge on photographic plate 250.

It should be noted that, in the embodiment illustrated in FIG. 1, the reference beam and the object beam are seen to be incident on the interference plane at a relatively large angle with respect to one another. Thus, this embodiment is best suited for the technique of holographic interferometry. In the case of double exposure holographic interferometry, the laser source 100 will preferably be a pulsed laser so that two separate exposures of photographic plate 250 may be easily provided. Otherwise a mechanical or electro-optic shutter may be used to interrupt a beam from a continuous-wave laser. In any case, the changes in the optical path length during the time of exposure should be less than the order of an eighth-wavelength of the light source being used. For real time holographic interferometry, a continuous-wave laser may be used to illuminate the exposed hologram.

Figure 2:
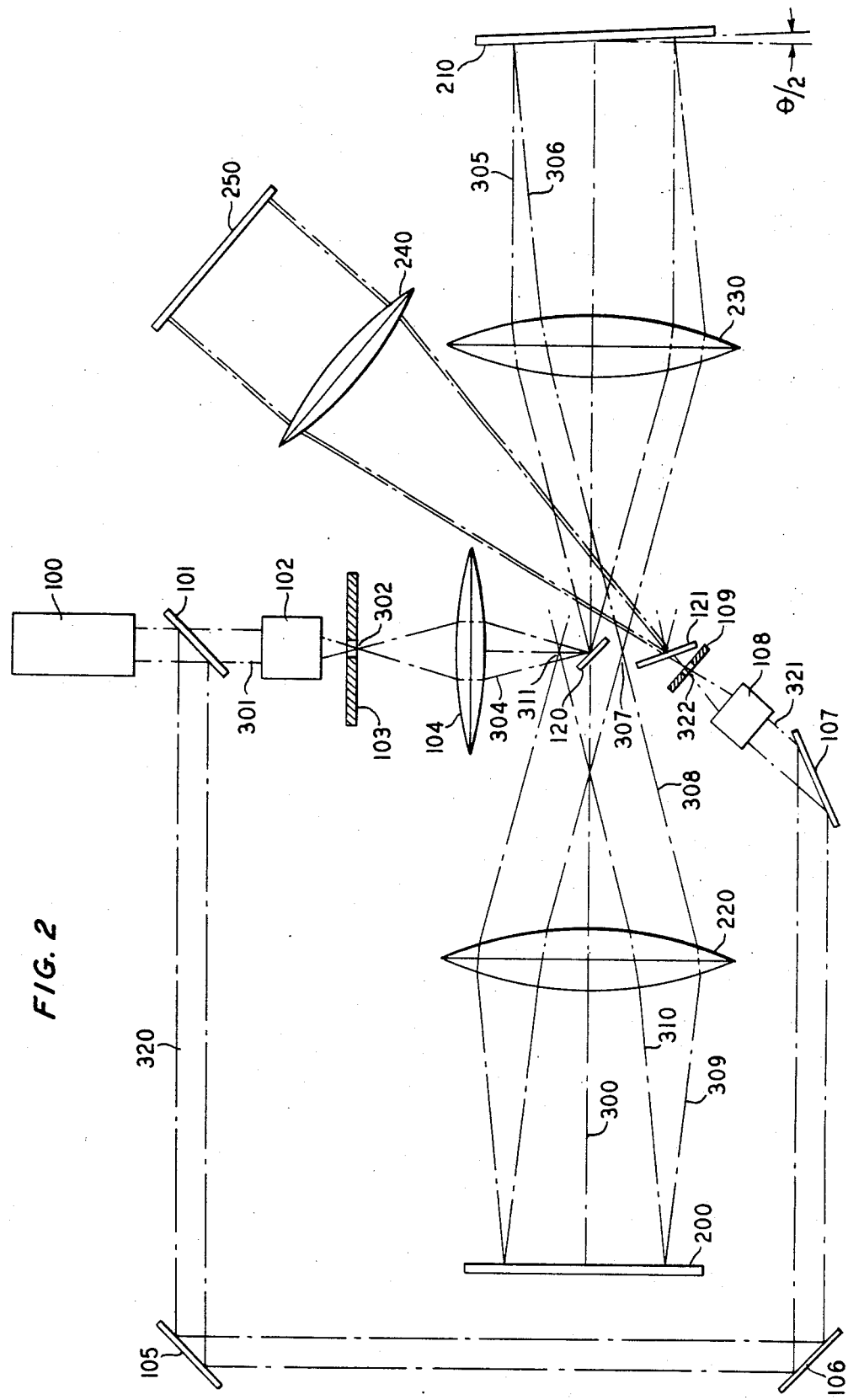
FIG. 2 is a diagram showing another embodiment of a multipass interferometer constructed according to the teachings of the present invention.

If, on the other hand, it is desired to view or record visible interference fringes directly (nonholographically), the apparatus of FIG. 1 may be easily modified to achieve this result. As was pointed out above under the heading, "Background of the Invention," the requirement for direct observation of the fringes is that the reference beam and object beam approach the interference plane at a very small angle with respect to one another. This requirement can be fulfilled if the reference beam optics are rearranged. Small mirrors 105, 106, and 107, together with short focal length lens 108 and pinhole spatial filter 109 may be rearranged so that the reference beam is focused to a point at the rear, or lower left, side of small mirror 121. A multipass interferometer including such rearranged reference beam optics is shown in FIG. 2. If small mirror 121 is made partially transparent, the reference beam will pass through this mirror toward lens 240 and photographic plate 250. The reference beam and the object beam will come together at photographic plate 250 at a very small angle. The exact angle will be determined by the location of the points at which the reference beam and the object beam are focused at small mirror 121. In this embodiment the interference fringes may be viewed directly with a screen substituted for photographic plate 250.

The arrangement described above for the direct non-holographic observation of fringes may suffer from the fact that imperfections in the optics may give rise to artifacts in the fringe pattern which may obscure the fringe details. This difficulty may be overcome through use of the moire pattern technique. In this technique the angle between the reference beam and the object beam is adjusted so that the fringes are very close to each other, but still visibly separable. In double exposure moire interferometry, two exposures are made of the photographic plate. Differences in the object between the two exposures are revealed as a moire pattern on the developed plate. In real time moire interferometry only one exposure is made. The developed plate is reinserted into the apparatus in the same position in which it was originally exposed. When the plate is reilluminated, a moire pattern varying in real time with the object may be observed.

As was pointed out above, the object beam passes through the multipass cavity a number of times. As will be demonstrated below, each ray in the object beam incident on a particular point on a given cavity mirror will return to this same point on each subsequent pass through the multipass cavity. Thus, an object placed in the object space proximate a cavity mirror will introduce variations in the optical path length which are cumulative with each pass. Due to these cumulative variations, the sensitivity of the interferometer is increased by a factor $n$, where $n$ is the number of passes of the object beam through the object space. On each round trip through the multipass cavity, the object beam makes two passes through the object space. Generally, therefore, $n$ is an even number.

Figure 3:
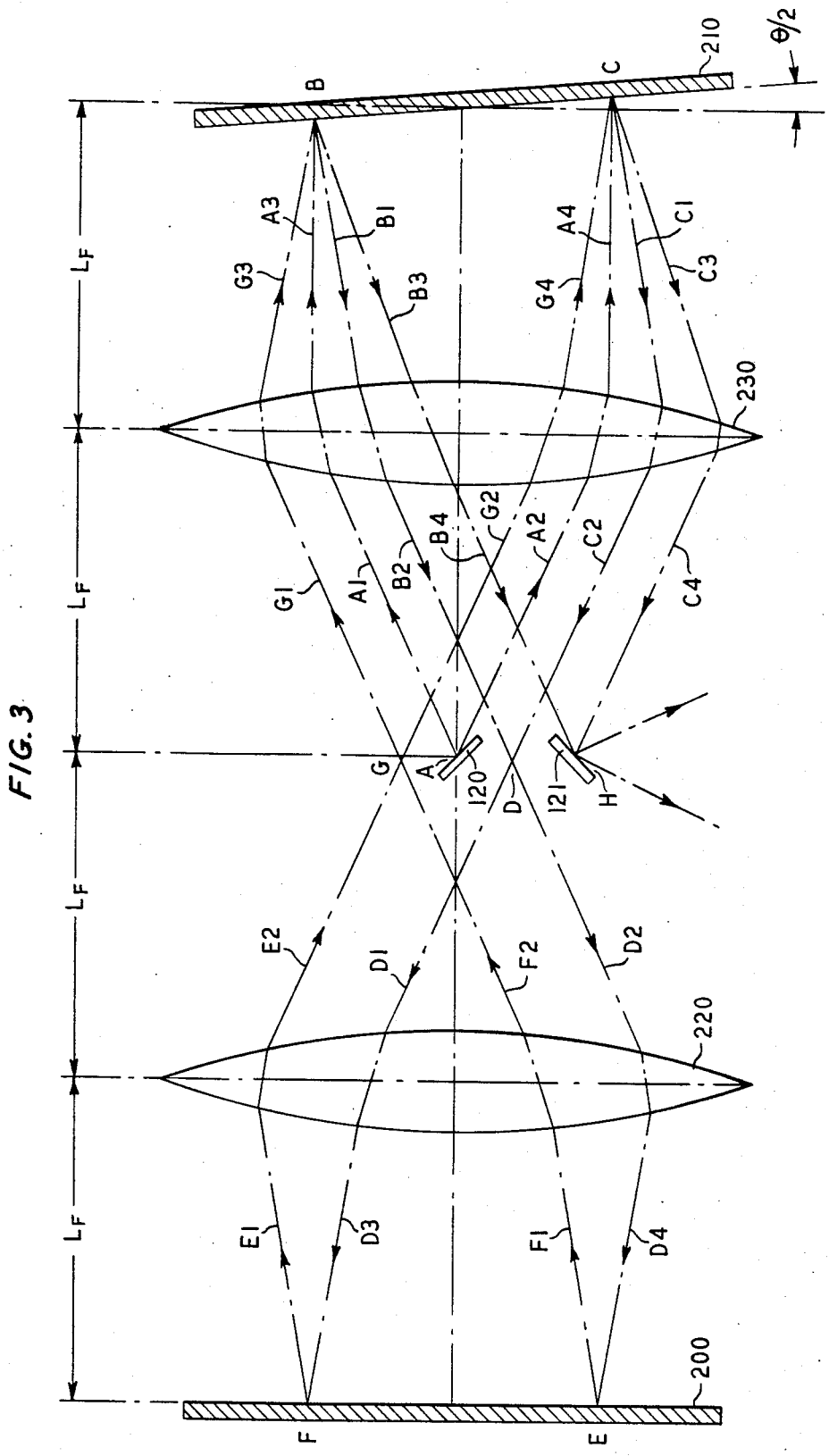
FIG. 3 is a diagram of the multipass cavity portion of the interferometer of FIG. 1. This diagram illustrates in part the principles of operation of this invention.

FIG. 3 illustrates in greater detail the theory of operation of the multipass cavity. FIG. 3 will be explained by means of ray tracing concepts familiar in geometrical optics. The length dimension of this figure, i.e., the dimension along the optical axis, is shortened with respect to the dimension perpendicular to the optical axis in order to facilitate the illustration of salient concepts of this invention. The dimension symbol $L_f$ indicates the common focal length.

In FIG. 3 the object beam is shown introduced into the multipass cavity at point A via reflection from small mirror 120. This beam diverges from point A in a direction parallel to the optical axis of the cavity until it reaches lens 230. Two rays A1 and A2 are shown to illustrate this diverging beam. As was pointed out above, lens 230 focuses this converging wavefront into a wavefront which is essentially plane. This focusing operation is illustrated in FIG. 2 by the bending of the rays A1 and A2 emerging from point A to form rays A3 and A4 which are essentially parallel to the optical axis 300. These rays pass through the space between lens 230 and mirror 210, including the object space. They are incident on mirror 210 at the points labeled B and C.

Mirror 210 is inclined at an angle $\theta/2$ with respect to the plane perpendicular to the optical axis 300. Since the angle of incidence is equal to the angle of specular reflection, the rays B1 and C1 reflected from mirror 210 on the first pass will be inclined at an angle $\theta/2$ downward from the optical axis. These rays B1 and C1 are incident on lens 230. Lens 230 will refocus these parallel rays into a converging wavefront. This operation is indicated by the bending of these two parallel rays B1 and C1 into rays B2 and C2 which are focused to a point at point D in the common focal plane of the two lenses. Point D is located a distance $\theta f$ below the optical axis 300.

The rays D1 and D2 emerging from point D from right to left indicate a diverging wavefront beam propagating toward lens 220. Lens 220 focuses this diverging wavefront beam into a parallel wavefront beam as is indicated by the bending of the rays D1 and D2 from point D into parallel rays D3 and D4. These rays propagate through the space from lens 220 to mirror 200, impinging on mirror 200 at points E and F. Since point D is located at distance $\theta f$ below the optical axis of the multipass cavity, the two rays D3 and D4 which have been bent by lens 220 to form parallel rays are inclined in the space between lens 220 and mirror 200 at an angle $\theta/2$ upward.

Since the angle of incidence is equal to the angle of reflection, these rays are reflected from points E and F to form rays E1 and F1, which are inclined at an angle $\theta/2$ upward with respect to the optical axis 300. These rays E1 and F1 indicate a plane wavefront beam propagating at an angle $\theta/2$ upward with respect to the optical axis. This beam is focused by lens 220 into a converging wavefront beam, which is indicated by the rays E2 and F2 which converge to point G in the common focal plane. At point G the object beam, indicated by rays G1 and G2, begins diverging toward lens 230 where it is converted into a plane wavefront beam. This plane wavefront beam is indicated by rays G3 and G4 propagating at an angle $\theta/2$ downward with respect to the optical axis.

Following the ray tracing scheme, it is seen that the rays G3 and G4 impinge upon mirror 210 at the same points B and C at which the rays A3 and A4 from point A impinged upon this mirror. Therefore, the walk-off problem of prior art multipass interferometers is avoided.

From points B and C, the two rays B3 and C3, indicating the plane wavefront beam, are reflected downward at an angle $\theta$ with respect to the optical axis 300. The beam is focused into a converging wavefront beam, as is indicated by the rays B4 and C4 converging at point H. Point H is located a distance of $2\theta f$ below the optical axis 300. For purposes of illustration, it is assumed that the object beam has now achieved the desired number of passes. Therefore small mirror 121 is arranged to be positioned at point H to reflect the object beam outside of the multipass cavity. Multipass interferometers have been constructed, according to the teachings of this invention, to provide for a maximum of ten passes through the interferometer cavity. Useful interferometers can be constructed to provide for, typically, four to twenty passes, but more passes may be desirable for some applications.

It should be noted that as the number of passes increases, a given light ray traced on its path through the multipass cavity will make successively larger angles with respect to the optical axis on each pass. Therefore, for maximum avoidance of the walk-off problem, the object space is confined to the volume near one of the cavity mirrors. It should be remembered that due to the compressed dimensions of FIG. 2 the displacement of the beam in the direction perpendicular to the optical axis appears larger than in normal operation.

A typical embodiment of the present invention might have a cavity mirror separation of 80 centimeters, a cavity mirror radius of 10–15 centimeters, and an angle $\theta$ equal to 0.5°. In such a typical embodiment the cavity mirrors, lenses, and other optical components are rigidly held in place by mirror and lens holders, clamps, frames, or the like. Methods of rigidly securing optical components are well known in the art. The small mirrors 120 and 121 may be located on tapered supports so that only the narrow portion of the supports, on which the mirrors are mounted, extends into the area in which the object beam is focused. In fact, the small mirrors may even be formed by deposition on the supports themselves.

The present invention has been described in detail in an embodiment particularly useful for multipass holographic interferometry. A simple modification to this embodiment which allows direct, non-holographic viewing of interference fringes has also been described. Other modifications readily suggest themselves. For example, a multipass interferometer could be constructed using concave spherical cavity mirrors, with appropriate modifications of lens focal lengths and optical component spacing. Also, the applications of the multipass optical cavity are not restricted to interferometry, but extend to any situation wherein it is desired to repeatedly reflect an object beam through an optical medium. It will be obvious to those skilled in the art that many other modifications and alternative embodiments are possible within the spirit of this invention. Accordingly, the present invention is intended to be limited only by the scope and spirit of the appended claims.

What is claimed is:

1. A multipass interferometer wherein an object beam and a reference beam are combined to produce an interference pattern with improved sensitivity comprising:

A. first and second plane mirror surfaces spaced apart along an optical axis in contraposition to each other to form an optical cavity, said second surface being slightly inclined with respect to said first surface, B. first and second converging lenses disposed within said optical cavity between said first and second mirror surfaces so that said converging lenses have a common focal plane, said converging lenses imaging each of said mirror surfaces onto the other, C. means for directing said object beam onto one of said first and second mirror surfaces so that said object beam is alternately reflected by said first and second mirror surfaces, said object beam thereby traversing the length of said optical cavity a plurality of times, D. deflecting means located at a point in said common focal plane for deflecting said object beam to an interference plane external to said optical cavity, and E. means for directing said reference beam onto said interference plane so that said object beam and said reference beam combine to produce an interference pattern in said interference plane.

2. The multipass interferometer of claim 1 further comprising means for disposing a medium whose optical characteristics are to be examined within the space between the mirror surfaces and proximate at least one of said surfaces.

3. The multipass interferometer of claim 1 further comprising a photographic medium disposed in said interference plane for recording said interference pattern.

4. The multipass interferometer of claim 1 wherein each of said first and second converging lenses has a common focal length $f$, and wherein each of said first and second converging lenses is positioned at a distance $f$ from a corresponding one of said first and second plane mirror surfaces and said first converging lens is positioned a distance $2f$ from said second converging lens.

5. The multipass interferometer of claim 4 wherein said second surface is inclined at an angle $\theta/2$ with respect to said first surface and wherein said deflecting means is located a distance $m\theta f$ from said optical axis, whereby said object beam is reflected from said second mirror surface a total of $m$ times, where $m$ is an integer number.

6. Optical apparatus for processing an object light beam comprising:

A. first and second reflecting surfaces spaced apart along an optical axis in contraposition to each other to form an optical cavity, said second surface being slightly inclined with respect to said first surface, B. means for directing said object light beam into said optical cavity so that said object beam is reflected by said first and second reflecting surfaces along a succession of paths within said cavity, C. converging means disposed within said optical cavity, said converging means functioning to focus said object beam to a plurality of points, each of said plurality of points corresponding to a particular one of said succession of paths, said converging means also functioning to image each of said first and second reflecting surfaces onto the other so that each ray of said object beam is alternately incident on a unique point on said first reflecting surface and on a corresponding unique point on said second reflecting surface, D. means for intercepting said object beam at one of said plurality of points and diverting said object beam outside of said optical cavity.

7. The apparatus of claim 6 wherein said converging means comprises first and second converging lenses positioned along said optical axis within said optical cavity.

8. The apparatus of claim 7 wherein said means for directing said object light beam into said optical cavity comprises reflecting means disposed between said first and second converging lenses for reflecting said object light beam along said optical axis so that it is focused into essentially plane wavefronts by said second converging lens.

9. A multipass interferometer of increased sensitivity wherein a reference beam and an object beam are combined to produce an interference pattern comprising:
  A. a source of coherent light,
  B. a beam splitter disposed in the path of the light from said source for splitting said light into a reference beam and an object beam,
  C. a multipass optical cavity comprising
     1. first and second plane mirror surfaces spaced apart along an optical axis in contraposition to each other, said second surface being slightly inclined with respect to said first surface, and
     2. first and second converging lenses disposed along said optical axis between said first and second plane mirror surfaces, said converging lenses having a common focal plane,
  D. means for focusing said object beam to a point on said optical axis in said common focal plane of said multipass optical cavity,
  E. first small mirror means disposed at said point on said optical axis in said common focal plane for directing said object beam along said optical axis so that said object beam makes a plurality of traversals between said first and second plane mirror surfaces, and so that said object beam comes to a focus at one of a plurality of points in said common focal plane on each of said traversals,
  F. second small mirror means disposed at one of said plurality of points in said common focal plane for deflecting said object beam to an interference plane external to said optical cavity,
  G. means for directing said reference beam onto said interference plane so that said object beam and said reference beam combine to produce an interference pattern in said interference plane.

10. The multipass interferometer of claim 9 further comprising a photographic medium disposed in said interference plane to record said interference pattern.

11. The multipass interferometer of claim 10 wherein said source of coherent light is adapted to provide two pulses of light of short duration so that a double exposure hologram is recorded on said photographic medium when said source is activated.

12. The multipass interferometer of claim 9 wherein said second small mirror means comprises a partially transparent mirror, and wherein said means for directing said reference beam onto said interference plane comprises means for focusing said reference beam to a point near said one of said plurality of points in said common focal plane so that said reference beam passes through said second small mirror means and is incident on said interference plane at a very small angle with respect to said object beam.

* * * * *